(12) United States Patent
Smith et al.

(10) Patent No.: US 6,405,134 B1
(45) Date of Patent: Jun. 11, 2002

(54) METHOD AND APPARATUS FOR PREDICTING LIGHTNING THREATS BASED ON RADAR AND TEMPERATURE DATA

(75) Inventors: Michael Smith; Bill Vincent, both of Wichita, KS (US)

(73) Assignee: WeatherData, Inc., Wichita, KS (US)

( * ) Notice: Subject to any disclaimer, the term of this patent is extended or adjusted under 35 U.S.C. 154(b) by 38 days.

(21) Appl. No.: 09/650,732

(22) Filed: Aug. 30, 2000

(51) Int. Cl.[7] .............................................. G01V 169/00
(52) U.S. Cl. ......................................................... 702/4
(58) Field of Search .............................. 702/4; 342/26; 706/931

(56) References Cited

U.S. PATENT DOCUMENTS

| | | |
|---|---|---|
| 4,806,851 A | 2/1989 | Krider et al. |
| 4,996,473 A | 2/1991 | Markson et al. |
| 5,140,523 A | 8/1992 | Frankel et al. |
| 5,771,020 A | 6/1998 | Markson et al. |
| 5,832,456 A | 11/1998 | Fox et al. |
| 5,839,089 A | 11/1998 | Yasuda et al. |
| 5,959,567 A | 9/1999 | Wolfson et al. |
| 6,018,699 A | 1/2000 | Baron, Sr. et al. |

OTHER PUBLICATIONS

Wiley–Interscience, edited by Houghton, "Handbook of Applied Meteorology", pp. 144–149.
"Lightning And The Space Program" Nasa Facts Online, KSC Release No. 72–90, Jun. 1990, 9 pages.
"The Mystery of Cloud Electrification" American Scientist, Nov.–Dec. 1998, vol. 86, No. 6, 12 pages.

*Primary Examiner*—Donald E. McElheny, Jr.
(74) *Attorney, Agent, or Firm*—Banner & Witcoff, LTD

(57) ABSTRACT

The invention provides a system and method for predicting areas where lightning strikes are likely to occur by evaluating radar and temperature data. Radar volume data is analyzed to locate cloud tops that extend above a height corresponding to a temperature line of about –10° C. Areas where cloud tops extend above the height of the –10° C. line and that have a radar composite reflectivity greater than 30 dBZ are designated as probable lightning threat areas. Radar movement is tracked across at least two time periods, and a correlation algorithm predicts the future location of lightning threat areas at predetermined time periods (e.g., 10 minutes, 20 minutes, and 30 minutes) based on predicted radar values. A computer display shows the predicted location of the lightning threat areas for the future time periods. In one variation, selected structures or areas (e.g., power lines, factories, or the like) are superimposed on a computer display with predicted lightning threat areas to illustrate where lightning damage is likely to occur.

25 Claims, 12 Drawing Sheets

METHOD AND APPARATUS FOR PREDICTING LIGHTNING THREATS BASED ON RADAR AND TEMPERATURE DATA

TECHNICAL FIELD

The present invention relates generally to weather forecasting and warning systems. More particularly, the invention provides a method and apparatus for predicting lightning threats with a high degree of accuracy over geographic areas larger than a point.

BACKGROUND OF THE INVENTION

Weather prediction techniques have improved greatly in recent years. As weather predictions have become more accurate, businesses have begun to incorporate weather-related analysis into their corporate planning decisions. For example, U.S. Pat. No. 5,832,456 describes a system and method for predicting future retail performance on the basis of weather forecasts. Information concerning tornadoes, hurricanes, severe thunderstorms and the like have been used by utility companies, manufacturing plants, airlines, and other businesses to avoid losses and to reroute vehicles such as airplanes and trucks.

Certain types of businesses, such as electric utilities and cable TV companies, are particularly vulnerable to damage caused by lightning strikes. A lightning strike to a transformer or electric substation can immediately cause power outages for large numbers of utility customers. Electric companies frequently employ additional repair crews when severe lightning storms occur so that damage can be quickly repaired. Unfortunately, predicting where lightning is likely to strike with any real degree of accuracy has proved elusive, thus leaving companies scrambling to deploy repair crews only after lightning damage has occurred.

Conventional systems that attempt to predict where lightning damage is likely to occur typically rely on electrical or radio frequency sensors that detect changes in electrical activity. Such systems generally measure actual electrical activity and try to measure the location of the electrical activity. U.S. Pat. No. 5,140,523 (entitled "Neural Network for Predicting Lightning") uses a neural network coupled to electric field sensors to predict the future location of lightning activity. U.S. Pat. No. 5,771,020 (entitled "Lightning Locating System") describes a system that detects pulses from lightning discharge using RF energy sensors. U.S. Pat. No. 4,996,473 (entitled "Microburst/Windshear Warning System") discloses a system that relies on various types of RF sensors to detect increases in lightning rates over a period of time. Yet another system, described in U.S. Pat. No. 4,806,851 ("Thunderstorm Sensor and Method of Identifying and Locating Thunderstorms"), uses an electric field sensor to identify thunderstorms within a given range of the sensor. Television stations broadcast meteorological reports showing historical (e.g., past) movement of thunderstorms (e.g., those containing lightning), but do not show future predicted locations of such thunderstorms.

The aforementioned methods lack sufficient accuracy and robustness to be commercially useful to electric utilities, factories, or other structures that could be impacted by lightning strikes. For example, some systems essentially indicate whether lightning will strike a small number of geographic point sources (e.g., a specific radio transmission tower or power pole). In contrast, some companies, such as an electric utility or a railroad, need to know which portions of a geographically dispersed distribution system are vulnerable to a strike. Other conventional systems rely on the prior existence of lightning strikes to predict where future strikes may occur, thus making them ineffectual for predicting early forming storms for which no lightning has yet occurred. Predicting future lightning strikes based solely on previous actual strikes can also lead to inaccurate results. In short, conventional systems have not proved entirely satisfactory for commercial use.

SUMMARY OF THE INVENTION

The invention provides a system and method for predicting areas where lightning strikes are likely to occur by evaluating radar and temperature data. In one variation, radar volume data is analyzed to locate areas where cloud tops extend above a temperature line of about negative ten degrees Celsuis. Areas having cloud tops above that temperature line and a radar reflectivity greater than about 30 dBZ are designated "electrified" areas with lightning potential. Radar data is tracked across at least two time periods, and an algorithm using an image filtering technique predicts the future location of the lightning potential areas at predetermined time periods (e.g., 10 minutes, 20 minutes, and 30 minutes). A computer display shows the predicted location of the lightning threat areas for the current and future time periods.

In one variation of the invention, predicted lightning threat areas are compared to a database of structures (e.g., power lines, factories, and the like) and superimposed on a computer display to help illustrate where lightning damage is likely to occur. Based on the predicted lightning strike areas, utility companies can deploy repair crews to the most likely damage areas.

DETAILED DESCRIPTION OF THE INVENTION

Figure 1:
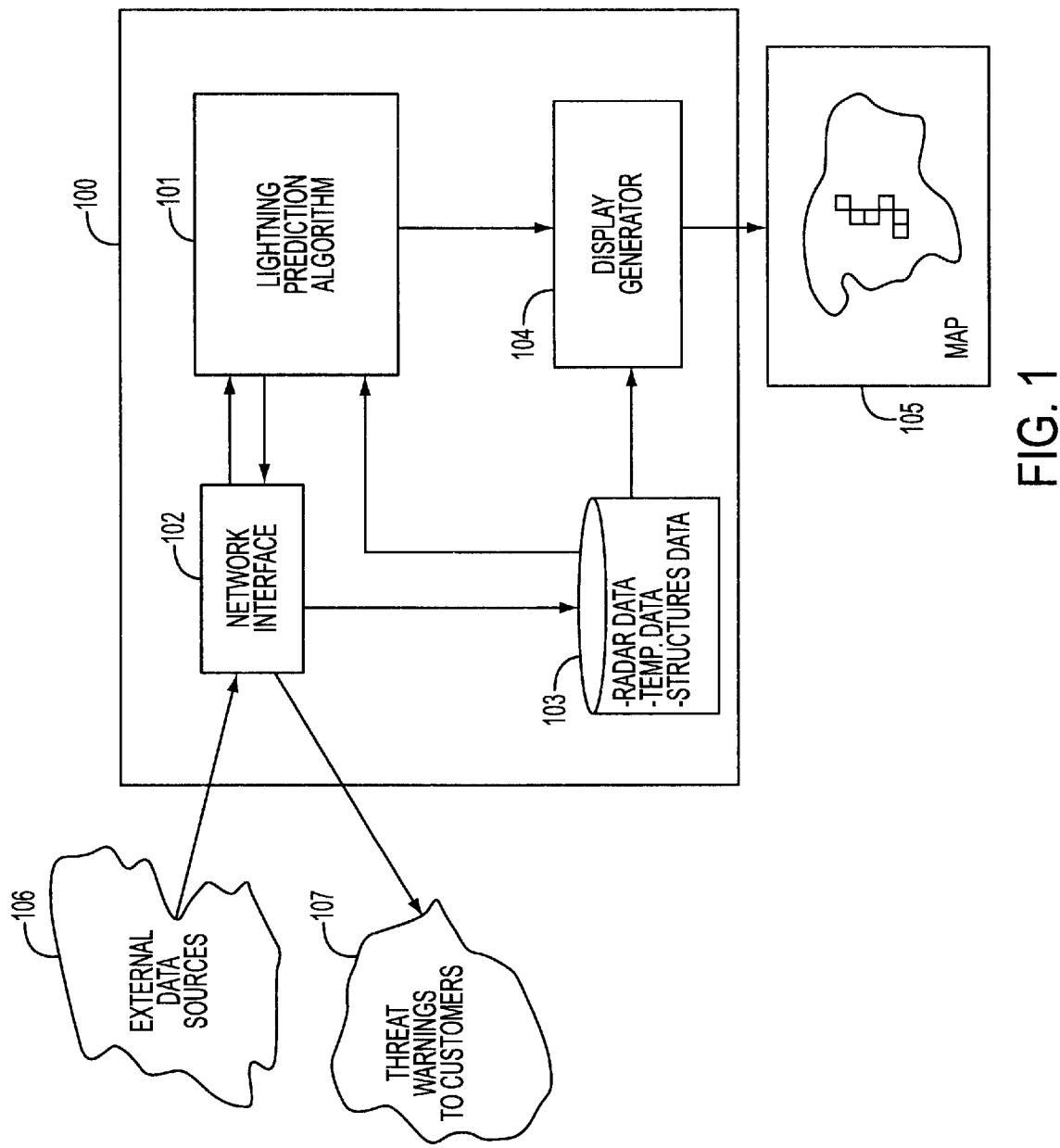
FIG. 1 is a schematic block diagram of a system that predicts lightning threat areas for display or dissemination to customers.

FIG. 1 is a schematic block diagram of a system that predicts lightning threat areas for display or dissemination to customers. A computer 100 includes a network interface 102 for communicating with external computer systems using a modem or other device. The communication can be over the Internet or via dial-up phone lines, for example. Radar data and other weather-related information is received from external data sources 106, such as the National Weather Service (NWS), and other sources that provide radar data and temperature data in well-known formats. Weather data is received and stored in a database 103 associated with computer 100.

A lightning prediction algorithm 101 that operates according to the inventive principles generates predicted lightning threat areas for display on a computer display device 105 using display generation software 104. In one variation, the threat data is displayed on a geographic map using a color-coded scheme to identify areas of lightning threat. Additionally, the location of power lines, factories, and other structures can be superimposed on the map such that customers of the service can quickly identify areas of predicted damage based on the threat. Other structures, such as radio towers, buildings, golf courses, manufacturing plants, airports, and the like can be similarly superimposed on the map in order to identify areas of predicted damage. In addition to providing a display showing lightning threats, the threat data 107 can be transmitted through network interface 102 externally to customers in the form of threat warnings, annotated map displays, and the like.

Figure 2:
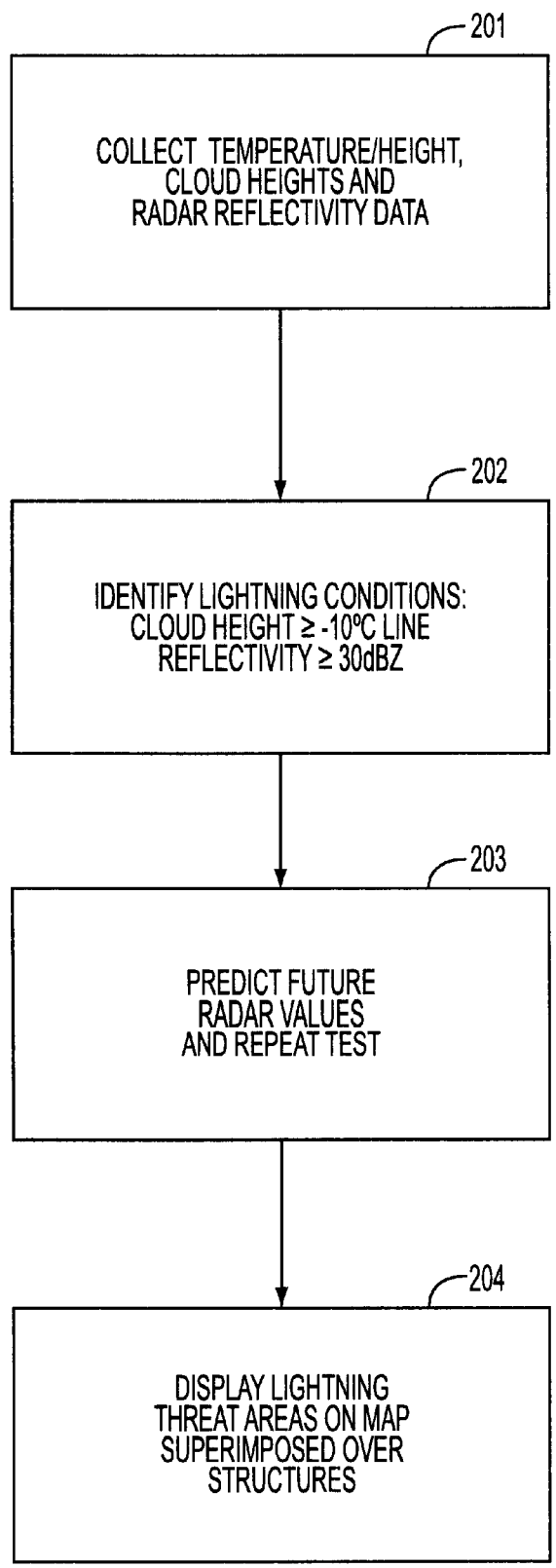
FIG. 2 shows a method for determining lightning threat areas for display on a geographic map.

Reference will now be made to FIG. 2, which shows a method of predicting lightning threat areas on the basis of cloud height data and radar reflectivity data. One aspect of the present invention takes advantage of the fact that cloud electrification frequently occurs when the top of a cloud extends above a temperature line of about −10° C. The −10 degree line can vary in height depending on various factors including the season and various types of weather conditions. Whatever its height, cloud formations extending above this line are suspect from the standpoint of potential for generating lightning strikes. Consequently, one variation of the invention combines information regarding cloud heights that extend above the −10 degree line with a predetermined radar reflectivity value to determine-whether lightning is likely to occur in a given geographic area.

Beginning in step 201, temperature data is collected for various heights over a given geographic area, typically from weather balloons. The National Weather Service releases balloons (normally twice a day) at various locations around the country, and provides in electronic form information concerning temperatures and associated heights. This information allows the height at which the −10 degree line occurs to be determined either directly or by interpolation. Also in step 201, cloud height data is collected from a radar source, such as the NEXRAD radars operated by the National Weather Service, which indicates the height at which cloud tops reside for a given geographic area (e.g., a 4 square kilometer area.). Also in step 201, radar reflectivity data is collected from a radar source, such as the NEXRAD radars, in order to identify the density of cloud formations over a given geographic area (e.g., the same 4 square kilometer area). Further details of the collection process and the format in which the data is obtained are provided below.

In step 202, areas of likely lightning activity are flagged by identifying geographic areas in which cloud heights extend above the −10 degree line and for which a composite radar reflectivity value is greater than or equal to about 30 dBZ. Areas meeting these conditions are displayed on a computer display or transmitted to a customer location for further use. The display generated from step 202 will be referred to as a "current time" display, representing the fact that areas meeting the criteria may be subject to lightning strikes, even if no lightning has yet been detected in the area.

In step 203, radar values for a future time (including cloud height data and composite reflectivity data) are predicted using an algorithm of the type described in U.S. Pat. No. 5,959,567, which is incorporated by reference herein. Further details of this process are described below. Based on the predicted radar reflectivity and cloud height values, the lightning detection algorithm is re-run for the future time period, and the predicted lightning threat areas are displayed on a computer display. The process can be repeated for future time periods such as 10, 20, and 30-minute periods, and any or all of the threat areas for current or future times can be displayed in a static or sequential manner.

In step 204, the lightning threat areas for current or future time periods can be displayed on the computer display in superposition relation to known structures, such as electric utilities, factories, railroad tracks, power lines, transformer substations, and the like. Customers willing to pay for accurate lightning prediction services can store the location of their vulnerable structures in the database and have them displayed in visual relation to the predicted lightning threat areas, thus allowing them to take evasive or corrective action (e.g., shutting down a factory, delaying a train, or activating electric utility repair crews).

It will be appreciated that the −10 degree line can be varied slightly without departing from the inventive principles; consequently, references to the −10 degree line should be understood to include values that approximate that value. In particular, it is believed that values between about −9 degrees and −15 degrees can be used without departing from the inventive principles. Similarly, although a composite radar reflectivity value of about 30 dBZ is described, other values near that value can be used without departing from the principles of the invention. Other radar reflectivity values other than the composite value described above can also be used without departing from the inventive principles. Moreover, while the temperature and radar data are illustrated as being received from an external source (e.g., via dial-up phone lines or the Internet), it will be appreciated that a computer can be located at the same location as the sensors and/or radar.

Additional details of the radar data, calculation process, and prediction process will now be provided with reference to the remaining figures.

Figure 3:
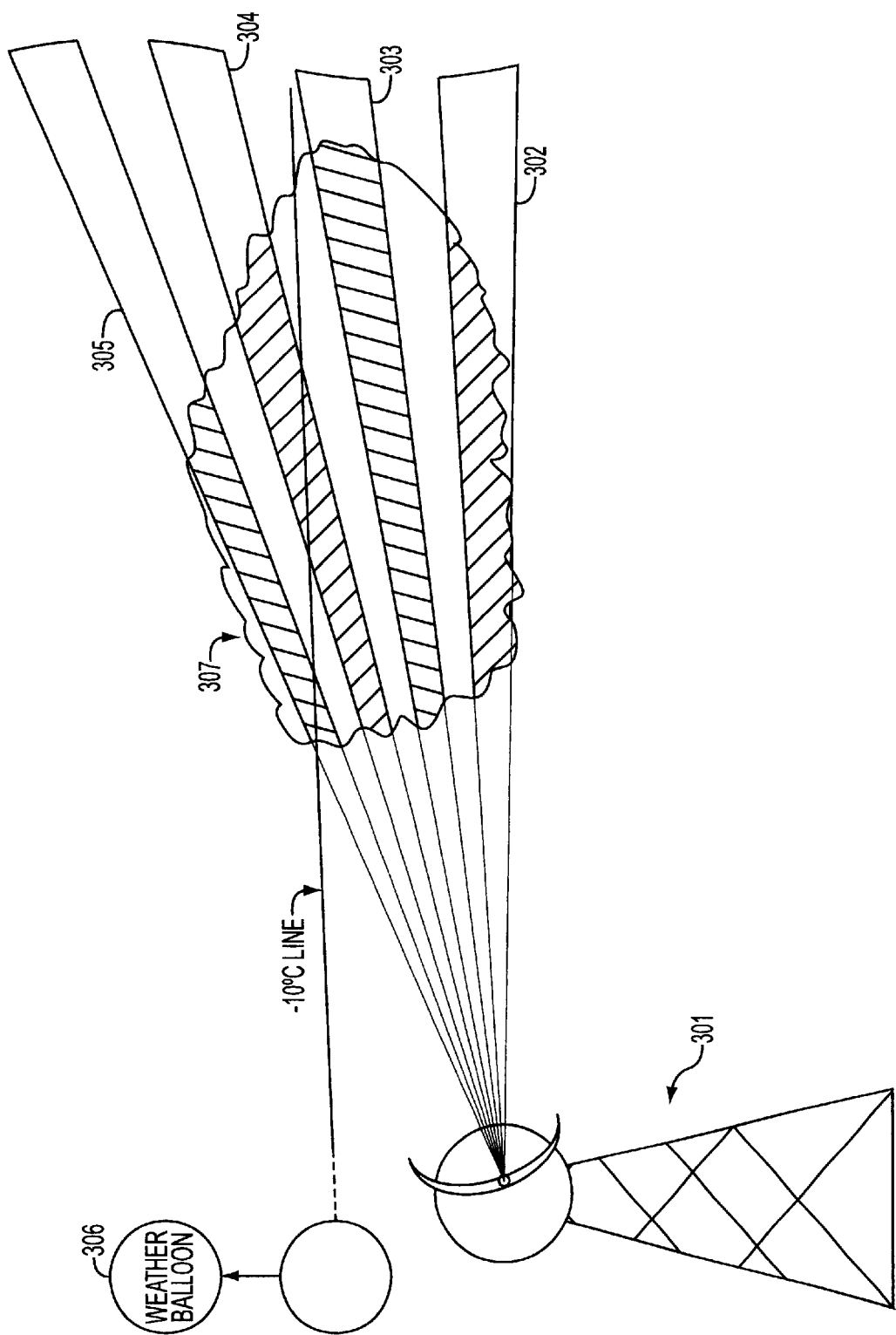
FIG. 3 shows how a weather radar generates a plurality of "slices" through a cloud.

As shown in FIG. 3, a radar 301 is located at a geographic point but sweeps in a circular pattern around the point. The radar, which may comprise for example a NEXRAD WSR-88D radar used by the National Weather Service, obtains a plurality of radar "slices" through a cloud 307, each slice covering a different arc (e.g., approximately 1 degree) from the previous slice. As shown in FIG. 3, for example, radar 301 generates four slices 302 through 305 as it scans through the atmosphere, and receives reflectivity information (measured in dBZ) for each slice.

Radar data can be obtained in known formats from the WSR-88D radar, which provides various modes and coverage patterns, and produces data products representing radar reflectivity data and derivations thereof. One product produced by such a radar is referred to as a "composite reflectivity" value, which represents the highest reflectivity value above a given resolution element from any elevation angle of a volume scan. A resolution element may comprise a 4 square kilometer area, for example. Consequently, for a given 4 square kilometer area, the radar will return the highest radar reflectivity value (in dBZ) for all of the scans above that area. That value will then be used in the algorithm according to one aspect of the present invention. Other information for each geographical resolution element from the radar can include radar ID, time and date of the scan, radar position, elevation, and operational mode. The data can be converted from radial scan format into raster (e.g., rectangular) data for processing in accordance with the invention.

In accordance with one variation of the invention, the height of the cloud tops is also used in conjunction with an algorithm to identify likely lightning threat areas. The National Weather Service also provides "echo top" data as a separate data product from the NEXRAD radars. This product identifies the height of the cloud tops for each resolution element. The inventive principles can be practiced by using the echo top data directly, or by deriving cloud height data using other radar data. A weather balloon 306 is shown in FIG. 3 to indicate that height vs. temperature data is also collected, although it need not be collected at or near the radar locations.

Figure 4A:
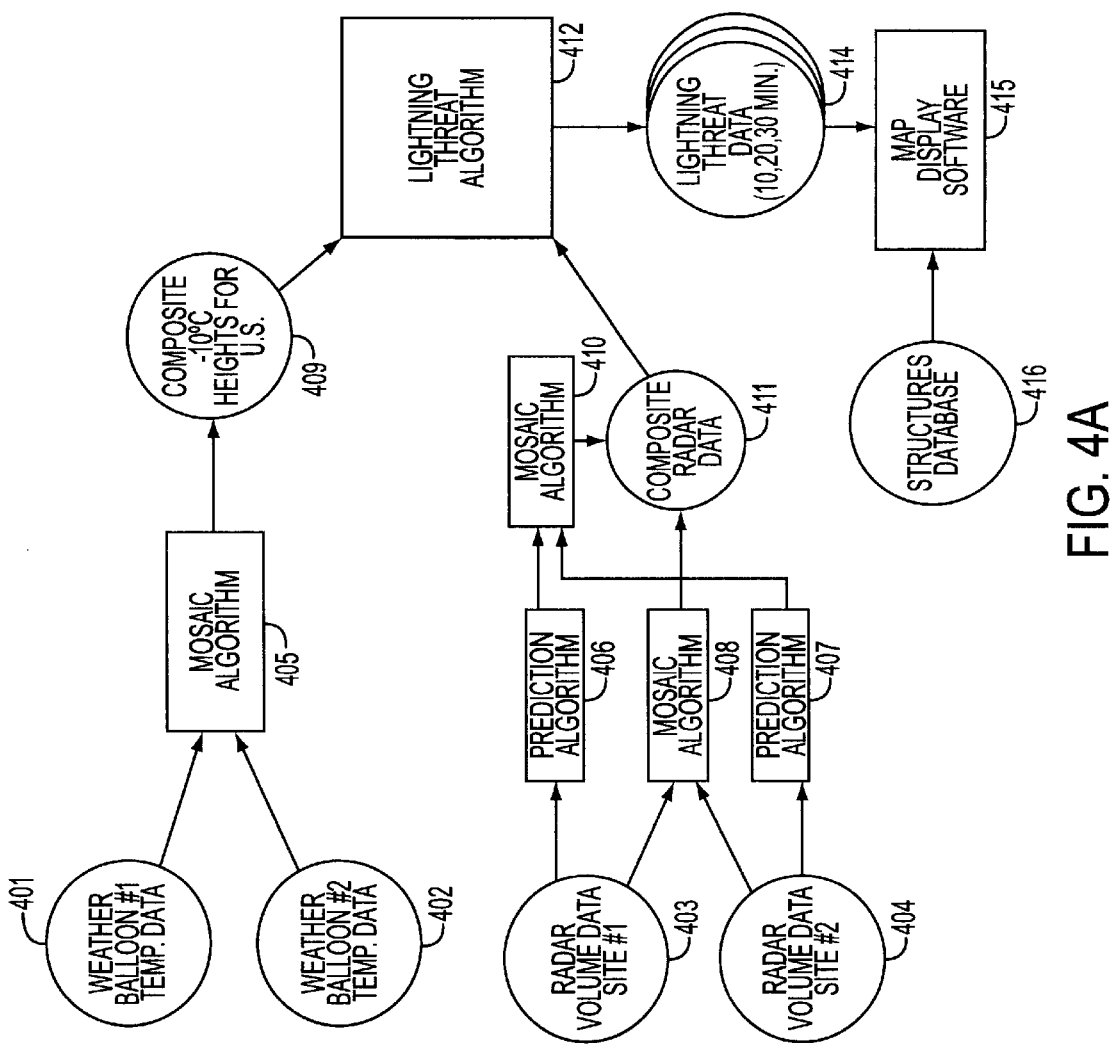
FIG. 4A shows additional details of a method and system for predicting and displaying lightning threat areas.

FIG. 4A shows additional details of a method and system for predicting and displaying lightning threat areas. Although the inventive principles can be used to predict current and future lightning threat areas based on data from a single radar (and single weather balloon), in one embodiment data from multiple weather balloons and radars is "stitched" together to form a mosaic of data covering a much broader area, such as the entire United States.

Beginning on the left side of FIG. 4, temperature vs. height data from two or more weather balloons 401 and 402 is received and processed in a mosaic algorithm 405 to "stitch together" values from multiple sensors into a larger geographic area. The resulting information represents composite temperature vs. height information for a large area (e.g., the entire United States) as indicated in circle 409 of FIG. 4. The composite temperature information includes or can be processed to include (e.g., by interpolation) the heights at which the −10 degree line appears over a broad geographical area, such as the entire United States.

Figure 6:
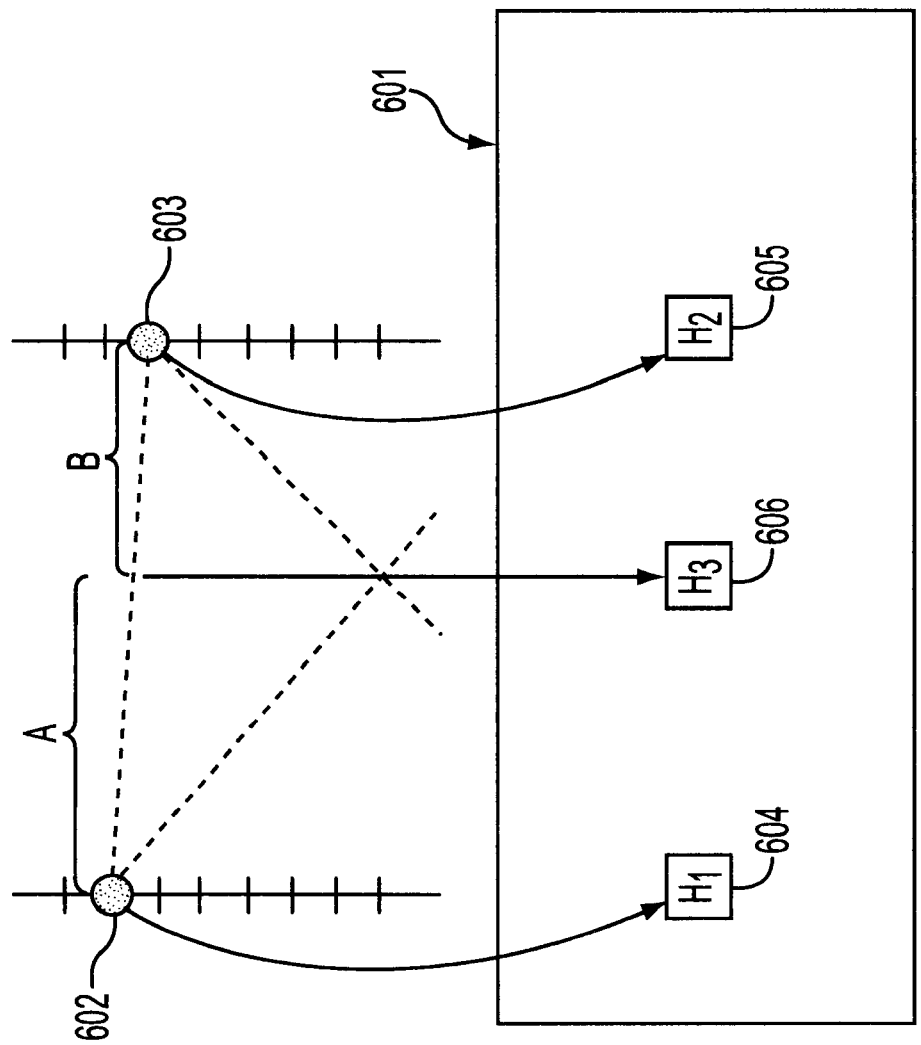
FIG. 6 shows details of a stitching algorithm that creates a mosaic of height values.

FIG. 6 shows details of one conventional mosaic or "stitching" algorithm 405 that can be employed to build a database of height values for a large area. Turning briefly to FIG. 6, it is assumed that a first weather balloon 602 is released at a particular LAT/LON location, and transmits temperature and height information as it rises. Although balloons can drift, temperatures are fairly stable across wide areas, and thus the starting LAT/LON position can be assumed to be a fixed location associated with temperature/height values as the balloon rises. A second weather balloon 603 is released at a different LAT/LON location and transmits temperature and height information as it rises.

A mosaic database 601 is constructed with cells that represent the height at which the −10 degree temperature occurs. (If an exact −10 degree value is not available for some reason, a height can be extrapolated from two heights that are on opposite sides of the −10 degree temperature). Each weather balloon will produce height information as it rises, and the height at which the −10 degree temperature is reached is stored in the mosaic database 601 for cells corresponding to the LAT/LON location of each weather balloon. For example, value H1 (the height at which weather balloon 602 records a −10 degree temperature) will be stored into cell 604, which corresponds to the LAT/LON location from which that weather balloon was released. Similarly, value H2 (the height at which weather balloon 603 records the −10 degree temperature) will be stored into cell 605, which corresponds to the location of weather balloon 603 in mosaic database 601.

Because only a limited number of weather balloons are released, data values obtained for cell locations near each weather balloon will be more accurate than cell locations that are some distance from a weather balloon. For that reason, interpolations of height values can be made between weather balloons to obtain values for cells that are located between neighboring weather balloons. For example, in order to obtain a height value H3 for cell 606, which corresponds to a location that is a distance A from weather balloon 602 and distance B from weather balloon 603, a weighted average of heights from weather balloons 602 and 603 can be derived, giving more weight to the value from weather balloon 603 (because it is closer) than to weather balloon 602 (which is farther away from the cell). This interpolation can also be done using three neighboring weather balloons, thus forming a "triangulation" function. The result of the "stitching" algorithm will be a mosaic of height values, one per cell, covering a large area such as the entire United States.

Figure 7:
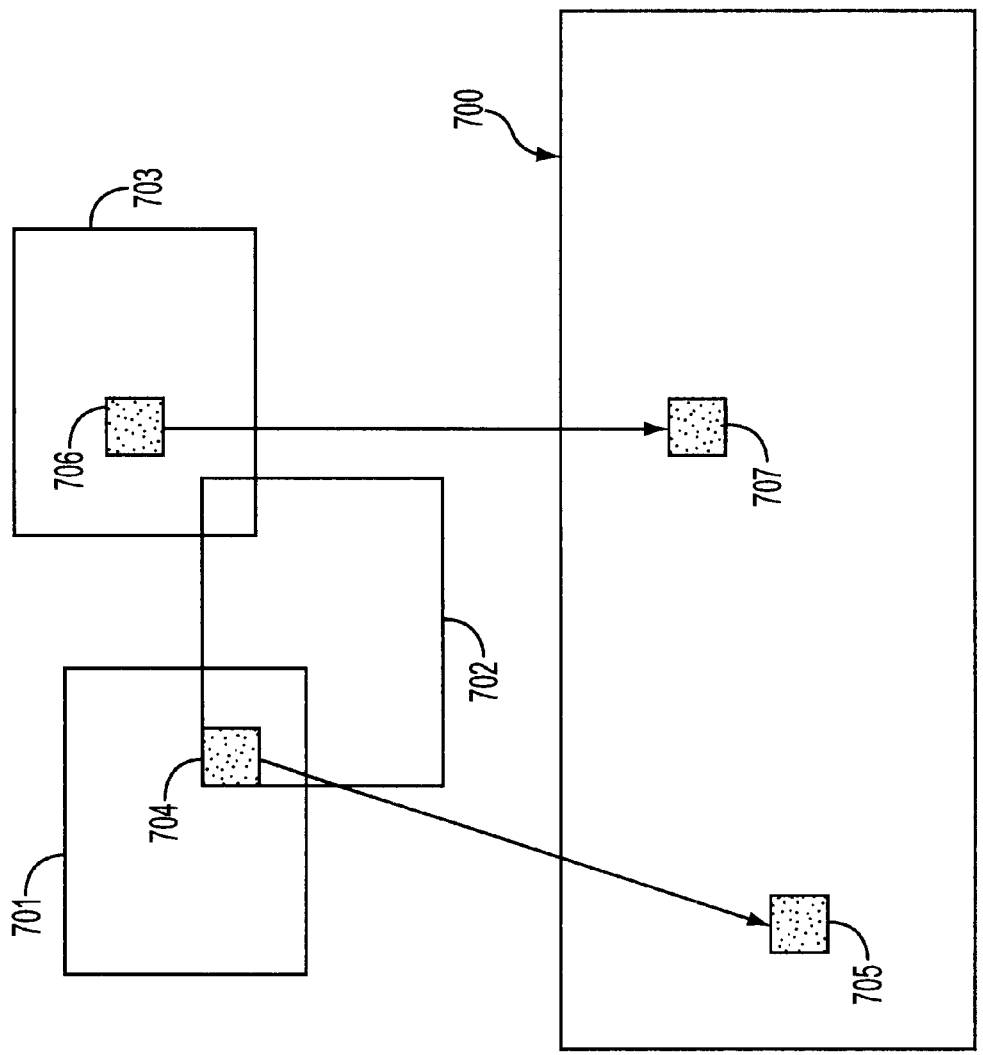
FIG. 7 shows how radar data from multiple different radars can be combined to form a single radar value for a particular area of interest.

Returning to FIG. 4A, radar volume data (e.g., including composite reflectivity and echo top data) is received from one or more radar sites 403 and 404 and stitched together to form a composite radar image 411 covering a larger geographical area than can be covered by one radar. A mosaic algorithm 408, different from the mosaic algorithm described above, can be used to stitch together different radar images. Reference will be made briefly to FIG. 7, which describes one possible algorithm for stitching together radar data from multiple radar sites (e.g., by assigning cloud height and reflectivity values for each 4 square kilometer area, derived from one or more radars). The mosaic algorithm shown in FIG. 7 is conventional.

In general, the radar mosaic algorithm makes use of the fact that multiple radar sites provide overlapping coverage. FIG. 7 shows raster-based data obtained from three different radar sites with three overlapping coverage areas 701, 702, and 703. A mosaic database 700 representing a much larger area (e.g., the entire United States) is constructed by stitching together data from one or more radar coverage areas 701 through 703. The radar data has known coordinates for the most north and west grid cell. Each cell has a known height and width. The mosaic 700 is also raster based, and has known coordinates for the most north and west grid cell; each cell also has a known height and width. Data values from each raster-based radar plot 701 through 703 is mapped to mosaic 700 as follows:

For each radar data cell:
1) Calculate the cell's coordinate:

radar_cell_latitude=north_radar_latitude+(radar_cell_column X radar_cell_height)

radar_cell_longitude=west_radar_longitude+(radar_cell_row X radar_cell_width)

2) Calculate the mosaic row and column for the radar data cell coordinate:

mosaic_cell_column=(radar$_{13}$ cell_longitude—north_mosaic_longitude)/mosaic_cell_width mosaic_cell_row=(radar_cell_latitude—west_mosaic_latitude)/
mosaic_cell_height 3) If the mosaic cell value is greater than the radar cell value, then do not change the value in the mosaic cell.
4) If the mosaic cell value is less than the radar cell value, then change the mosaic cell value to the radar cell value.

Using the above algorithm, radar data from a plurality of overlapping radar sites can be combined into a mosaic database 700, which can then be registered with height database 601 to permit radar data and height information for each cell to be evaluated according to various principles of the present invention.

Returning to FIG. 4A, the result of mosaic algorithm 408 is a composite radar data file 411 representing composite reflectivity and echo top data for large geographic areas spanning multiple radar sites. Radar volume data 403 from multiple time periods (e.g., every few minutes) is also fed into a prediction algorithm 406 to predict future radar data over intervals of for example 10, 20, and 30 minutes. Details of one possible radar prediction algorithm are provided in U.S. Pat. No. 5,959,567, and shown generally in FIG. 5. Radar data 404 from a second radar site is similarly fed into prediction algorithm 407 to predict future radar data. The predicted future radar data from each site is fed into a mosaic algorithm 410 (identical to mosaic algorithm 408) to produce composite radar data 411 including both current and future predicted composite reflectivity and echo top values.

In one embodiment, lightning threat algorithm 412 operates on the current and future composite reflectivity, echo top data, and temperature/height data to generate current and predicted future lightning threat areas 414. Geographic areas meeting the criteria for lightning threat are turned "on" and represented with a special pixel value (e.g., white, red, etc.) on a map display using conventional map display software 415.

According to one variation of the invention, a structure database 416 includes the known location of various structures such as factories, buildings, railroad tracks, power lines, golf courses, and the like. Some or all of the structural information can be superimposed on the lightning threat data map to clearly indicate structures or locations that may be vulnerable to a lightning strike. The structural information can be selectively displayed based on the owner of the structure or facility (e.g., show only power lines owned by a particular electric utility), or by category (e.g., show all golf courses and all train stations). Other variations are of course possible.

Any or all of the functions and algorithms shown in FIG. 4A can be implemented in computer software and stored on computer-readable media (e.g., magnetic or optical disks) for execution in a general-purpose computer.

Figure 4B:
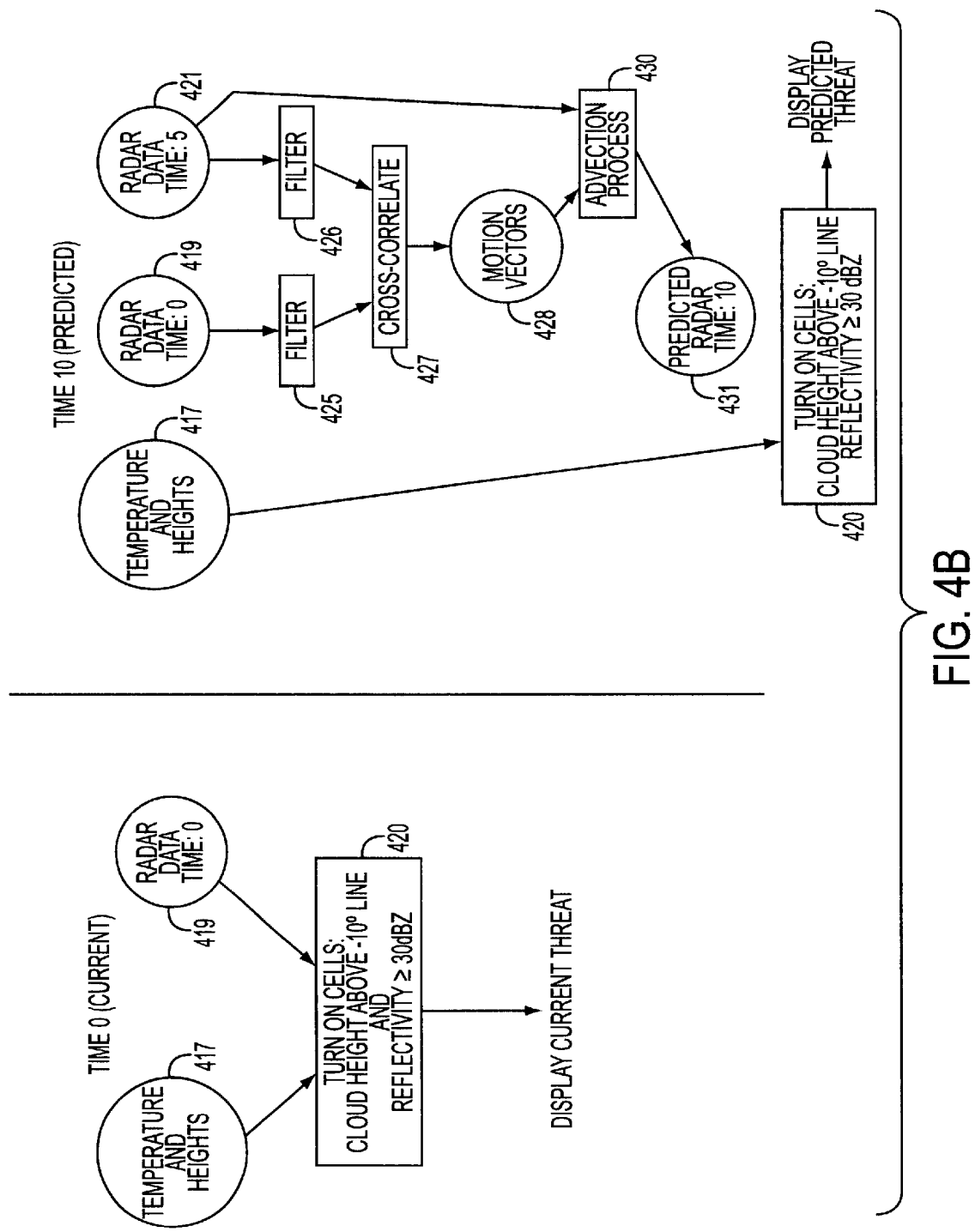
FIG. 4B contrasts the generation of lightning threat data for a current time (time 0) with generation of lightning threat data for a future predicted time (time 10).

Reference will now be made to FIG. 4B, which shows how lightning threat areas can be identified during a current time interval and for a future time interval. On the left side of FIG. 4B, a lightning threat algorithm 420 receives temperature and height data 417 (i.e., the heights at which the −10 degree line occurs for various geographic areas). The algorithm also receives reflectivity and echo top data from a current time (time 0) indicated at 419. As described above, the algorithm selects those areas having a cloud height extending above the −10 degree line and having a composite reflectivity greater than or equal to approximately 30 dBZ. The resulting areas are displayed as a current lightning threat, such as by coloring the areas on a map. (See, e.g., FIG. 8).

The right side of FIG. 4B shows how lightning threat data can be predicted for future time periods based on principles described in U.S. Pat. No. 5,959,567. The same lightning threat algorithm 420 evaluates cloud height and reflectivity data, but the data is for future periods rather than current conditions. The same temperature and height data 417 can be fed into the algorithm, on the assumption that this data is relatively static (and since weather balloons, which are the primary means of obtaining this data, are typically only launched a couple of times per day).

Radar data at time zero 419 and radar data at time five minutes 421 each are passed through an image filter 425 and 426. (Although shown as two separate filters, the same filter can be used for each set of image data). The filter is typically an elliptical or rectangular filter, and multiple filtered images are obtained based on rotations of the filter through 180 degrees. The filtered data is fed into a cross-correlation tracking function 427, which identifies changes to each area and generates motion vectors 428 indicating changes from one radar image to the next. The motion vectors are fed to an advection process 430, which modifies radar images from time 5 (element 424) to generate a predicted radar image at a future time (e.g., time 10) as shown by element 431.

The predicted radar data 431 resulting from advection process 430 along with the temperature data 421 are fed into the threat algorithm 420, which turns on areas based on the predicted radar data. In one embodiment, both composite reflectivity information and cloud top height information is predicted using the filtering, correlation, and advection process described above.

Figure 5:
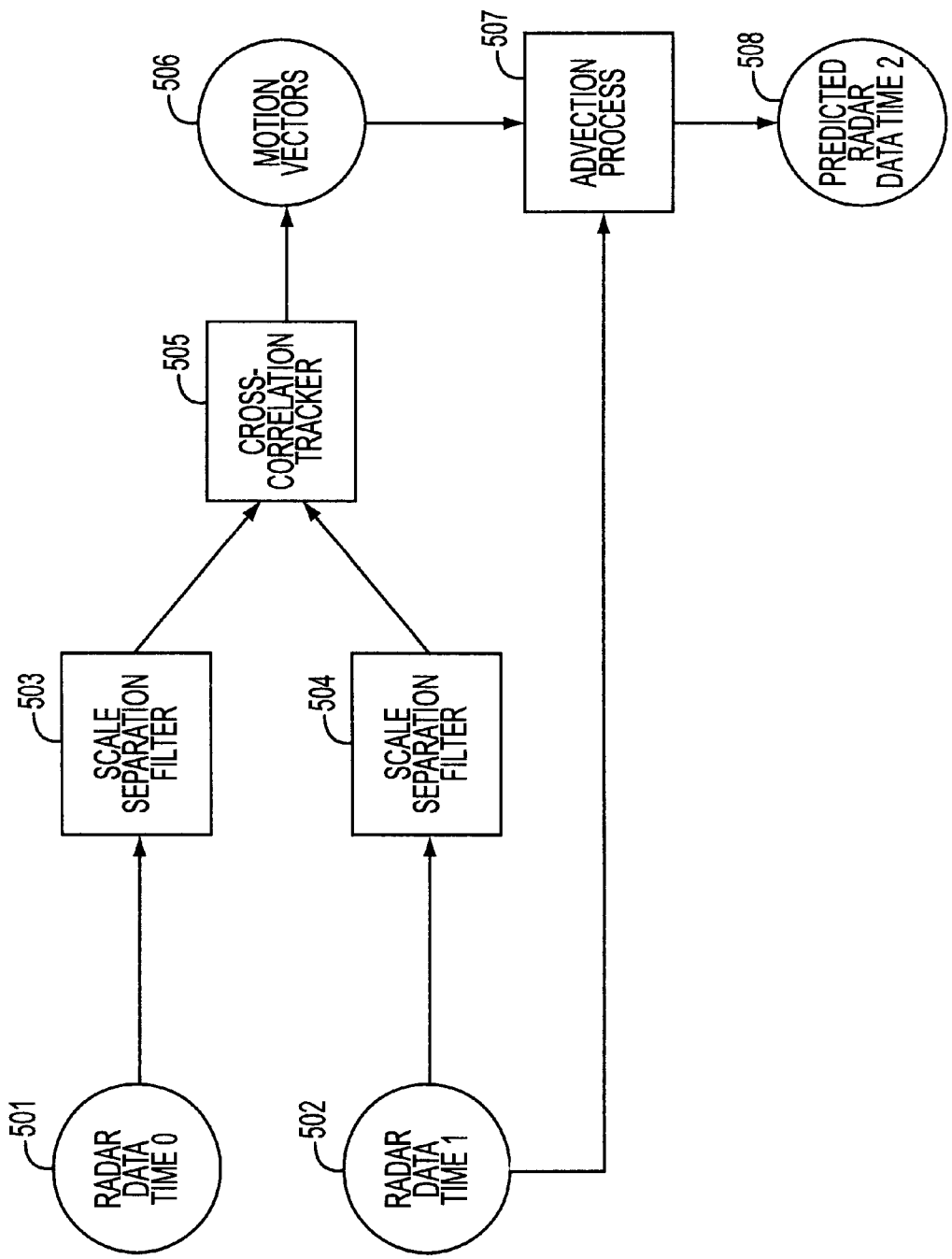
FIG. 5 shows details of a prediction algorithm of the type used to predict future radar values.

FIG. 5 shows more generally how radar data from two different time periods can be used to predict future radar data using scale separation filters, a cross-correlation tracker, and an advection process, in accordance with the principles described in U.S. Pat. No. 5,959,567. As shown in FIG. 5, radar data from a current time 501 is fed into a scale separation filter 503. Radar data from a later time period (e.g., 5 minutes later) 502 is similarly fed into an identical scale separation filter 504. The outputs of the filters 503 and 504 are fed into a cross-correlation tracker 505, of the type described in the aforementioned patent. The output of the cross-correlation process is a set of motion vectors 506, which becomes an input to advection process 507. Advection process 507 applies the motion vectors 506 to the radar data 502 to generate predicted radar data for a future time 508. This process can be performed both for the composite reflectivity values and for the echo top products in order to predict future reflectivity values for a given region and future cloud heights for the same region.

Figure 8:
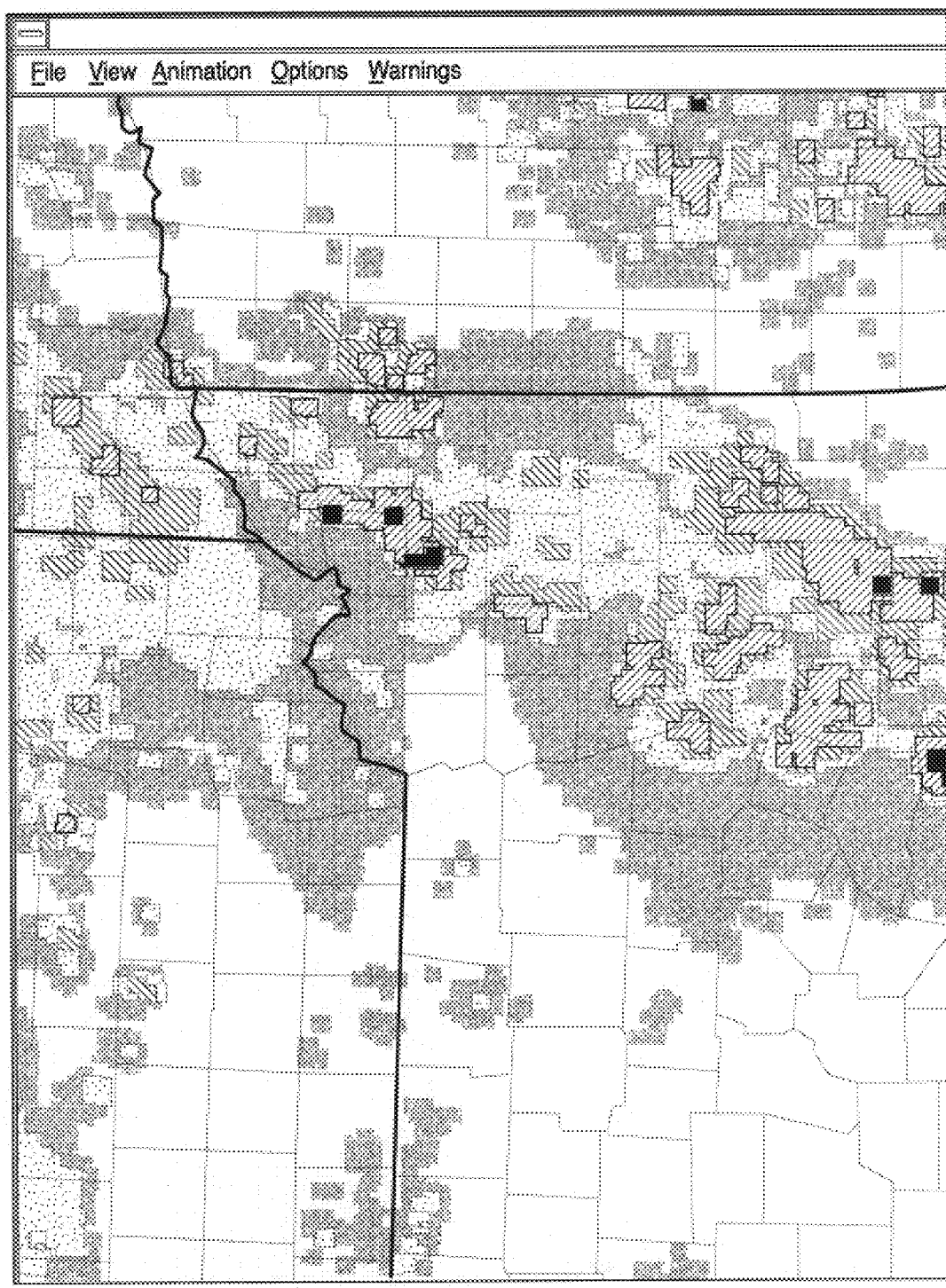
FIG. 8 shows lightning threat areas (white pixels) for a current time period according to one variation of the invention.

FIG. 8 shows a current lightning threat map display on which the pixel intensity indicates the lightning threat areas. White pixels indicate lightning threat areas, while darker pixel values indicate areas of high radar reflectivity only. In other words, the map display of FIG. 8 shows both lightning threat areas and other radar data. It will be appreciated that the lightning threat areas can be selectively displayed without other radar data, and vice versa.

Figure 9:
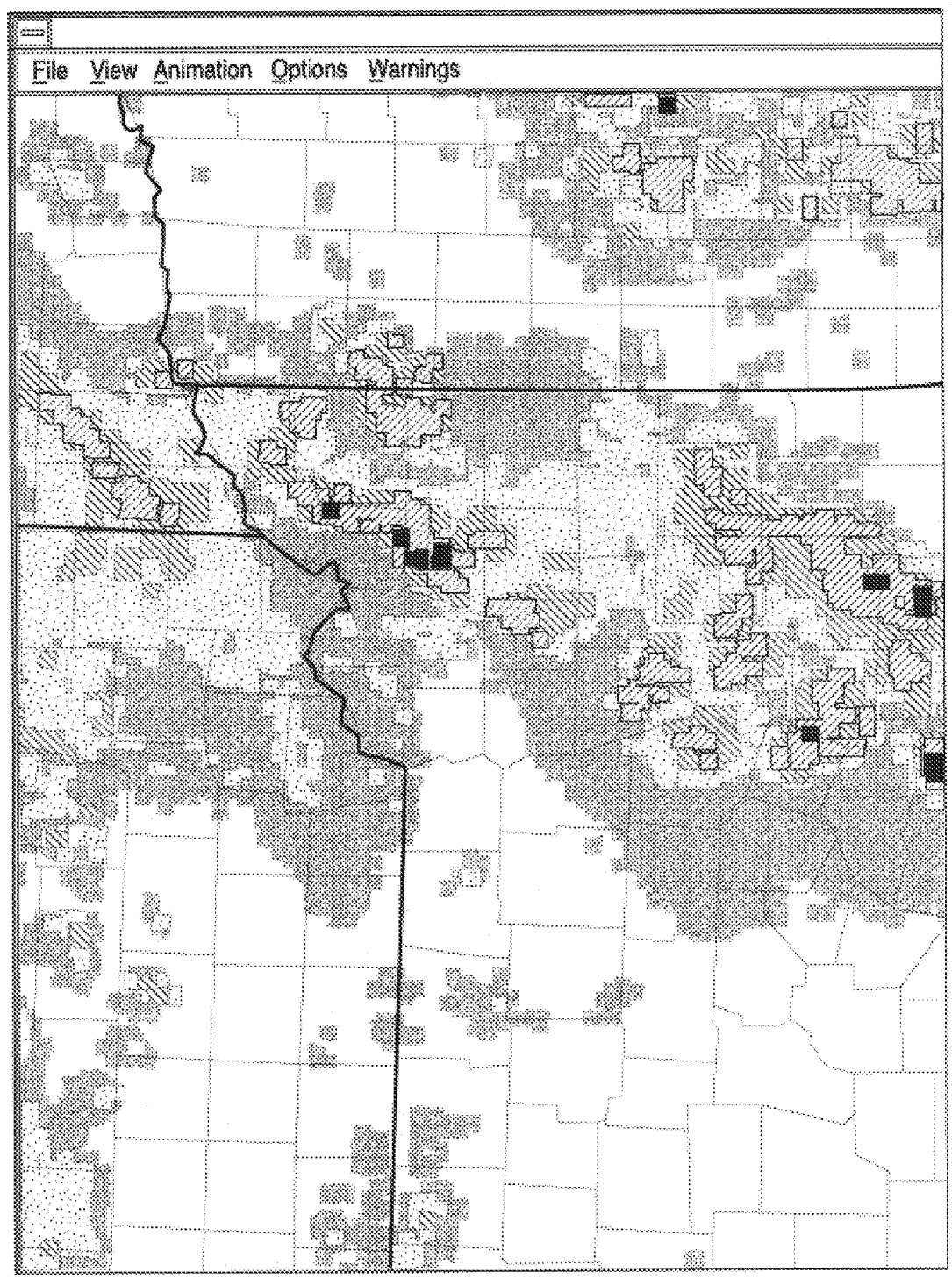
FIG. 9 shows lightning threat areas (white pixels) for a predicted future (10-minute) time period according to one variation of the invention.

FIG. 9 shows a future (predicted) lightning threat map display in which lightning threat areas have moved slightly to the right, indicating areas where lightning activity is likely to occur in the next 10 minutes.

Figure 10:
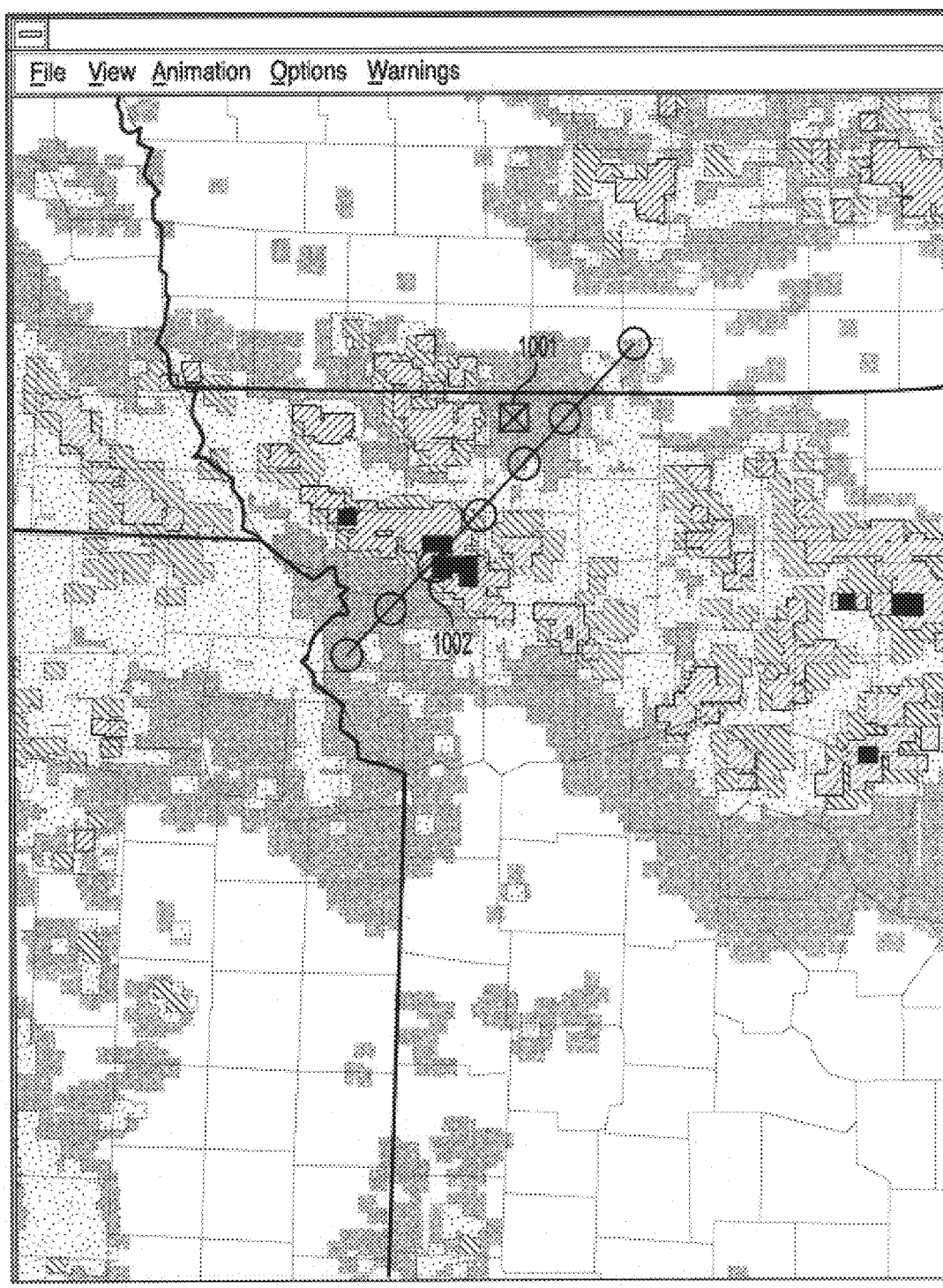
FIG. 10 shows lightning threat areas (white pixels) for a predicted future (20-minute) time period, superimposed with two structures 1001 and 1002, according to one variation of the invention.

FIG. 10 shows a future (predicted) lightning threat map display in which lightning threat areas have moved further to the right, indicating areas where lightning activity is likely to occur in the next 20 minutes. Also on FIG. 10, a factory 1001 is superimposed on the map, showing that it is just east of a future lightning threat area. A portion of a power line grid is also superimposed on the map, showing that an electric power pole 1002 is predicted to be in a lightning threat area in the next 20 minutes. Based on this information, owners or operators of these structures can take corrective or evasive action to mitigate damage arising from a lightning strike. In another variation of the invention, structures falling within a lightning threat area can be highlighted on the display without showing the radar or other data (e.g., the "lightning threat" can be shown by highlighting structures that are subject to a lightning threat, without showing any other data on the computer screen).

Figure 11:
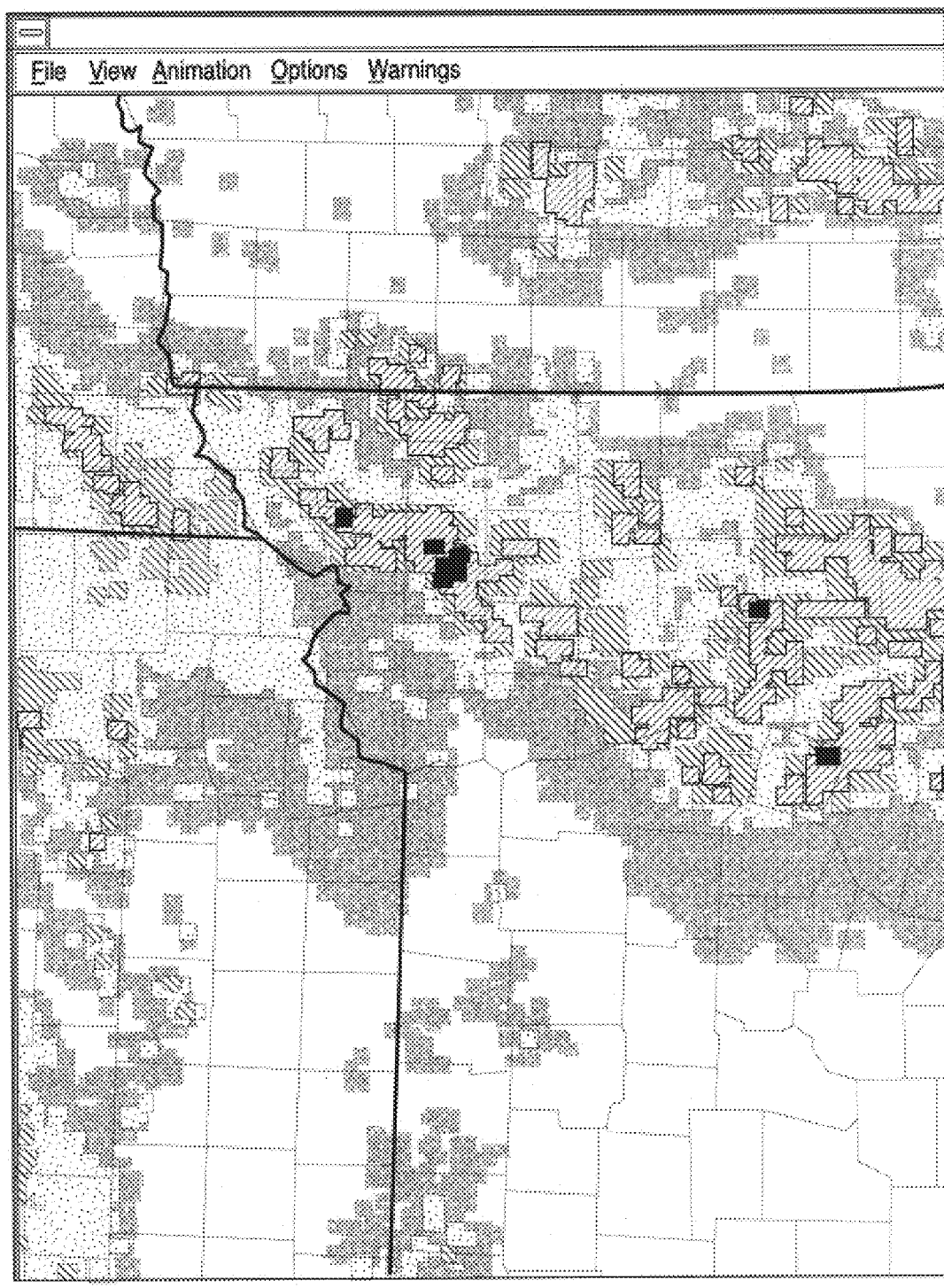
FIG. 11 shows lightning threat areas (white pixels) for a predicted future (30-minute) time period according to one variation of the invention.

FIG. 11 shows a future (predicted) lightning threat map display in which lightning threat areas have moved further to the right, indicating areas where lightning activity is likely to occur in the next 30 minutes. The display of structures is turned off in the display example of FIG. 11. The computerized map display and superposition techniques described above (excluding the inventive aspects described herein) is conventional, and no further elaboration is necessary.

What has been described above is merely illustrative of the application of the principles of the present invention. Other arrangements and methods can be implemented by those skilled in the art without departing from the spirit and scope of the present invention. Any of the methods of the invention can be implemented in software that can be stored on computer disks or other computer-readable media for execution in a host or target computer. No claim should be interpreted to be in means plus function format. Numbered steps in method claims should not be interpreted to require a particular ordering of the steps.

What is claimed is:

1. A computer-implemented method of predicting future lightning activity, comprising the steps of:
   (1) receiving cloud height data indicating heights of cloud formations over a geographic region;
   (2) comparing the data received in step (1) with a measured height value corresponding to a height at which a predetermined temperature line occurs;
   (3) identifying those portions of the geographic region having cloud heights that extend above the measured height value and that exhibit a composite radar reflectivity value greater than a predetermined reflectivity value; and
   (4) displaying the portions identified in step (3) on a computer display as lightning threat areas.

2. The computer-implemented method of claim 1, wherein step (3) comprises the step of using a measured height value corresponding to a temperature line of approximately −10° C.

3. The computer-implemented method of claim 2, wherein step (3) comprises the step of using a composite reflectivity value of approximately 30 dBZ.

4. The computer-implemented method of claim 1, further comprising the step of displaying structures on the computer display in relation to the lightning threat areas.

5. The computer-implemented method of claim 1, further comprising the steps of:
   (5) predicting radar data for a future time period; and
   (6) using the predicted radar data to predict future cloud heights and future composite radar reflectivity values, and using the future cloud heights and future composite radar reflectivity values in steps (2) and (3) to predict future lightning threat areas.

6. The computer-implemented method of claim 1, wherein the portions in step (3) comprise areas of approximately 4 square kilometers in size.

7. The method of claim 4, further comprising the step of displaying structures that represent a utility company's resources.

8. The method of claim 1, further comprising the step of transmitting a threat warning to a utility indicating that certain utility resources are subject to a lightning threat.

9. A computer-implemented method of displaying predictive lightning data, comprising the steps of:
   (1) displaying on a computer screen predicted lightning threat areas, each predicted lightning threat area corresponding to a predetermined geographic area in relation to a geographic map; and
   (2) superimposing on the computer screen structures in relation to the geographic map, such that locations of the predicted lightning threat areas can be visually compared to locations of the structures.

10. The computer-implemented method of claim 9, wherein step (2) comprises the step of displaying power line grids as the structures on the computer screen.

11. The computer-implemented method of claim 9, further comprising the step of predicting the lightning threat areas on the basis of radar reflectivity and temperature data.

12. The computer-implemented method of claim 11, wherein the predicting step comprises the steps of:
   (a) identifying cloud tops that exceed a height at which a predetermined temperature exists;
   (b) identifying areas having a composite radar reflectivity that exceeds a predetermined threshold; and
   (3) designating areas that meet conditions identified in both steps (a) and (b) as lightning threat areas.

13. The computer-implemented method of claim 12, wherein step (a) comprises the step of using a height corresponding to a temperature of about −10° C., and wherein step (b) comprises the step of using a predetermined composite radar reflectivity threshold of about 30 dBZ.

14. A system for predicting lightning threat data, comprising:
   a computer that receives radar and temperature vs. height data; and
   a computer program that executes on the computer, the computer program comprising a lightning threat algorithm that compares the received radar and temperature vs. height data with predetermined thresholds to identify geographic areas having cloud tops that exceed a height corresponding to a predetermined temperature threshold and having a radar reflectivity value that exceeds a predetermined reflectivity threshold, and generates information that identifies geographic areas that meet both the predetermined temperature threshold and the predetermined reflectivity threshold as lightning threat areas.

15. The system of claim 14, wherein the computer program further comprises a prediction algorithm that predicts radar data for a future time period, and wherein the lightning threat algorithm further operates on the predicted radar data to generate information that identifies future lightning threat areas.

16. The system of claim 15, wherein the prediction algorithm applies an image filter and a correlation tracker to the received radar data and generates motion vectors, and uses an advection process to apply the motion vectors to the received radar data to predict the radar data for the future time period.

17. The system of claim 16, wherein the prediction algorithm predicts future cloud top height tops and future composite reflectivity values.

18. The system of claim 14, wherein each geographic area comprises an area of approximately 4 square kilometers.

19. The system of claim 14, wherein the predetermined temperature threshold is approximately −10 degrees Celsius, and wherein the predetermined reflectivity threshold comprises a compositive reflectivity value of approximately 30 dBZ.

20. A computer-readable medium comprising computer instructions that, when executed in a computer, perform the steps of:
   (1) receiving cloud height data indicating a height of cloud formations over a geographic region and radar reflectivity values indicating cloud density over the geographic region;
   (2) comparing the cloud height data received in step (1) with a measured height value indicating a height at which a predetermined temperature line occurs; and
   (3) identifying those portions of the geographic region having cloud heights that extend above the measured height value and that exhibit a radar reflectivity value of greater than a predetermined reflectivity value as lightning threat areas.

21. The computer-readable medium of claim 20, wherein the computer instructions further comprise instructions that display the lightning threat areas on a map.

22. The computer-readable medium of claim 20, wherein the computer instructions that perform step (2) compare the radar data with a height corresponding to a temperature line of approximately −10° C.

23. The computer-readable medium of claim 20, wherein the computer instructions that perform step (3) identify those geographic areas having a composite radar reflectivity value of greater than about 30 dBZ.

24. The computer-readable medium of claim 21, wherein the computer instructions further display structures on the computer display such that the lightning threat areas can be viewed in conjunction with the structures.

25. The computer-readable medium of claim 20, wherein the computer instructions identify lightning threat areas having a size of approximately 4 square kilometers.

* * * * *